April 28, 1953
S. C. CARNEY
2,636,831
COLLOIDAL SULFUR PROCESS
Filed Oct. 21, 1949
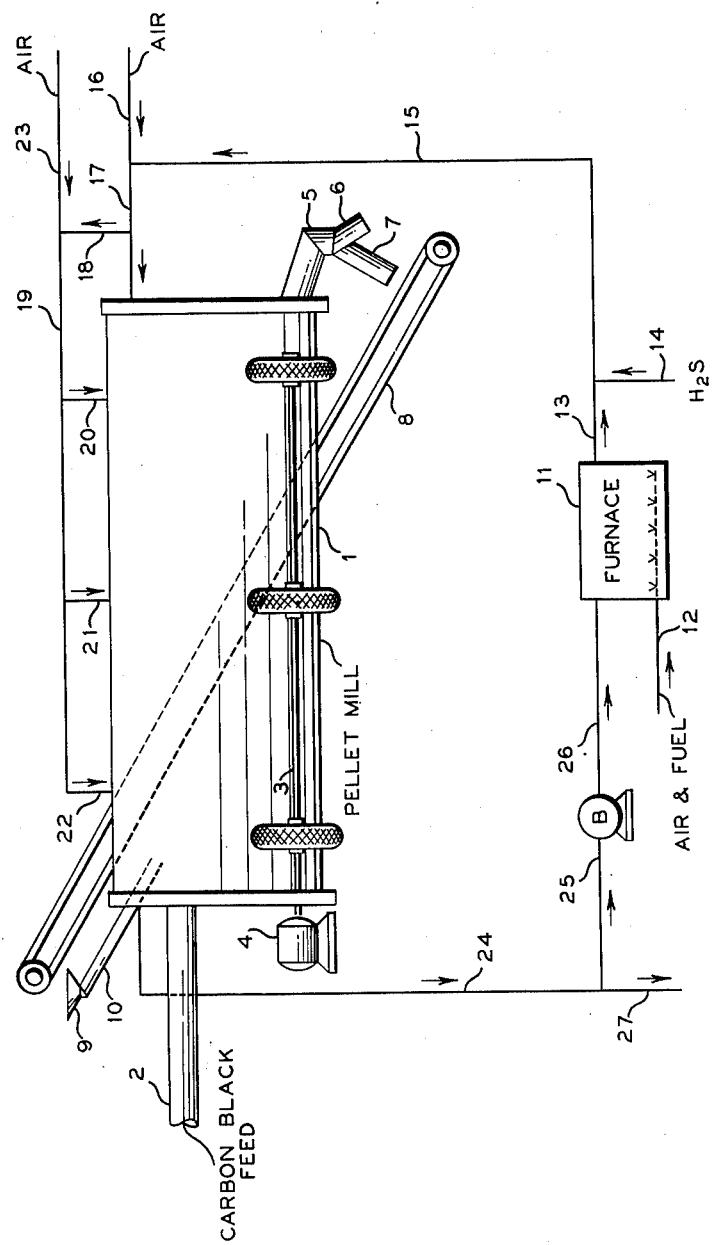
INVENTOR.
S.C. CARNEY
BY *Hudson and Young*
ATTORNEYS Patented Apr. 28, 1953

2,636,831

UNITED STATES PATENT OFFICE 2,636,831

COLLOIDAL SULFUR PROCESS

Samuel C. Carney, Bartlesville, Okla., assignor to Phillips Petroleum Company, a corporation of Delaware Application October 21, 1949, Serial No. 122,745

8 Claims. (Cl. 106—307)

This invention relates to a process for producing colloidal sulfur. In one aspect this invention relates to a process for producing colloidal sulfur by oxidation of hydrogen sulfide in the presence of carbon black. In another aspect this invention relates to a process for depositing colloidal sulfur on carbon black. In a specific embodiment this invention relates to a process for producing carbon black pellets containing colloidal sulfur.

An object of my invention is to provide a novel process for producing colloidal sulfur.

Another object of my invention is to provide a process for the oxidation of hydrogen sulfide in the presence of carbon black to produce colloidal sulfur.

A further object of my invention is to provide a process for depositing colloidal sulfur on carbon black.

A still further object of my invention is to provide a process for depositing sulfur on carbon black during the pelleting of the carbon black to produce a carbon black pellet containing colloidal sulfur.

Another object of my invention is to produce a carbon black pellet containing sulfur which is useful in the compounding of rubber.

Another object of my invention is to provide a novel process for pelleting carbon black.

Further and additional objects of my invention will be readily manifest from my disclosure hereinafter.

I have found that colloidal sulfur can be produced by oxidizing hydrogen sulfide in the presence of carbon black. The carbon black acts as a catalyst for the oxidation of the hydrogen sulfide, and the sulfur resulting from the oxidation reaction is in the colloidal form. During the oxidation the colloidal sulfur is deposited upon the colloidal carbon black to produce a carbon black containing deposited colloidal sulfur particles. The particle size of the colloidal sulfur is much smaller than the particle size of the carbon black, and the sulfur is stabilized at that smaller size by the carbon black. As a consequence of the small particle size, the sulfur is dispersed throughout the carbon black.

The temperature at which the hydrogen sulfide is oxidized may vary over relatively wide limits. For example, a temperature within the range of 200 to 1200° F. may be used to effect my process, and in many instances a temperature within the range of 300 to 600° F. will be found suitable.

In my process the hydrogen sulfide is first oxidized to form sulfur dioxide in accordance with the equation $$2H_2S + 3O_2 \rightarrow 2SO_2 + 2H_2O$$

The resulting sulfur dioxide reacts with additional hydrogen sulfide in accordance with the equation $$2H_2S + SO_2 \rightarrow 3S + 2H_2O$$

Thus, to produce the colloidal sulfur, hydrogen sulfide and oxygen are employed in a molar ratio of 2:1 in accordance with the overall equation $$2H_2S + O_2 \rightarrow 2S + 2H_2O$$

In actual operation a molar ratio of hydrogen sulfide to oxygen within the range of 1.8:1 to 2.2:1 is employed. Molar ratios outside this range are not desirable since they cause a decreased production of sulfur due to either unreacted hydrogen sulfide or the formation of sulfur dioxide which is not converted to the desired colloidal sulfur.

During the reaction a considerable quantity of water is formed, but at my preferred reaction temperatures the water is in the form of steam and it presents no problem since it leaves the reaction zone in the exit gases. After the reaction has begun, additional quantities of liquid water may be introduced to the reaction to evaporate in the reaction zone and, thus, dissipate heat of reaction. Similarly, other coolants inert to the reaction may be employed, but water is preferred.

The carbon black that is used in my process may result from any of the known processes for producing carbon black. It may be produced by the channel process wherein natural gas is burned in a deficiency of oxygen, and the flame is caused to impinge upon a relatively cooler metal surface on which the carbon is deposited and from which it is recovered. Similarly, the carbon black may be a furnace black which results from the thermal decomposition and reforming and/or partial combustion of hydrocarbons in a reducing atmosphere. Also, the carbon black may have incorporated therewith metallic oxides which enhance its catalytic properties and which are not incompatible with the prospective use of the carbon black. For example, if the carbon black containing the deposited colloidal sulfur is to be used for the production of synthetic rubber, the carbon black for my process may contain metallic oxides, such as zinc oxide, in the proportion of 0.5 to 5 weight per cent. The presence of the zinc oxide improves the catalytic properties of the carbon black for the hydrogen sulfide oxidation reaction, and the presence of the zinc oxide in the product of my process is desirable since zinc oxide is frequently used in the compounding of rubber.

As the source of oxygen an oxygen-containing gas is employed. This gas may be relatively pure process oxygen, but for economy it is preferred to use air. The inert gases in air, such as nitrogen and the like, have no deleterious effect in my process, and these inert gases leave the reaction zone along with the exit gases. If exit gases are returned to the reaction, as in the preferred embodiment described hereinbelow, the accumulation of inert gases in the system can be avoided by an occasional purging of the inert gases from the system.

In my process, the carbon black serves a double purpose. It acts as a catalyst for the oxidation reaction, and the carbon black particles function as nuclei on which the sulfur deposits in more or less molecular form, or at least in a colloidal form. By the term "colloidal form," I mean particles of very small size, that is, in the neighborhood of about one micron. Colloidal sulfur is electronegative and carbon black is likewise electronegative. Colloidal sulfur will, nevertheless, be deposited on the carbon black particles in a manner similar to the deposition of colloidal sulfur on glass which is also electronegative.

The quantity of sulfur that is deposited upon the carbon black may vary over a wide range, and the quantity deposited will depend, to a large extent, upon the particular utilization of carbon black containing the colloidal sulfur. For example, if the product of my process is to be used for agricultural dusting, the produce may contain as much as 25 to 50 weight per cent sulfur. If the product is to be used for compounding rubber, the quantity of colloidal sulfur contained in the product may be about 4 weight per cent. Actually, the product may contain from 0.05 to 50 weight per cent colloidal sulfur, and for most purposes a content of colloidal sulfur of from 1 to 10 weight per cent is adequate.

My process may be effected by various methods. For example, the hydrogen sulfide and oxygen-containing gas may be passed through a bed of carbon black, either in the pelleted or unpelleted form, at a space velocity sufficient to fluidize or to turbulently agitate the carbon black but insufficient to carry the carbon black from the reactor in the effluent gas. Obviously, this method of operating is readily adaptable to either a batch or a continuous process. My preferred method of operation, as described in detail hereinbelow, comprises oxidizing the hydrogen sulfide in a carbon black pelleting mill, and consequently colloidal sulfur is deposited on the carbon black during the pelleting operation. The result is an improved carbon black pellet containing colloidal sulfur. When using my preferred method of operation, carbon black pellets are produced which, in addition to containing colloidal sulfur particles, have improved properties for use in the compounding of rubber. For example, the carbon black pellets resulting from my process, when compared with pellets from conventional pelleting processes, have a lower pH and a greater hardness, and in rubber mixes they effect a longer scorch time. These improved properties enhance the value of the carbon black pellets for compounding rubber, and the improved properties are believed to result from the fact that during the operation of my process the pellets are in contact with air or other oxygen-containing gas and with sulfur dioxide. As disclosed in the copending applications, Serial Nos. 67,674 and 87,473, of Martin R. Cines, treatment of carbon black pellets with air and sulfur dioxide improves the physical properties of the pellets.

The single figure is an elevational schematic drawing of a preferred method for effecting my invention disclosed herein. This drawing does not include such conventional equipment as valves, pumps, compressors, and the like, but their inclusion is believed to be obvious to one skilled in the art without departing from the scope of my invention.

High modulus furnace black, from a source not shown is introduced to pelleting mill or drum 1 via feed line 2 at a feed rate varying from 15,000 to 40,000 pounds per day. The carbon black may be at atmospheric temperature or it may be at a slightly elevated temperature, say, a temperature of 175° F. Pelleting drum 1 is an elongated, cylindrical, steel shell mounted on wheel assembly 3 for purposes of support and rotation. Wheel assembly 3 is composed of two shafts upon which are mounted rubber tired wheels, one of the shafts being positioned on either side of the drum to serve as a support. At least one of the shafts is rotated by a source of power 4. By providing a proper gear reduction in conjunction with the source of power 4 or by providing a variable speed electric motor, drum 1 may be rotated at any desired speed. Normally, I operate at a drum speed of 10 to 25 revolutions per minute. If desired, the interior of drum 1 may be provided with scrapers to maintain the walls of the drum free from adhering carbon black. Or, if desired, a hammer assembly may be installed outside the drum with a number of hammers positioned at spaced intervals along the length of the drum. The hammers may be operated by a cam means in such a manner that all hammers strike the drum simultaneously or that only one hammer will hit the drum at a time. This latter method is preferable.

Feed line 2 contains a horizontally disposed conveyor means which is positioned axially throughout at least a portion of the length of the drum. This conveyor means may preferably be a screw conveyor, and the tube in which is disposed the rotating screw is provided with openings positioned at intervals along its bottom. These openings are so positioned that the carbon black is added to the carbon black pellets in the rotating drum at desired points. It is preferred that the first addition of carbon black be added to the pelleting drum at a distance of from 2 to 4 feet inside the drum so that the quantity of pellets recycled (as described hereinbelow) is in a state of equilibrium when the first portion of the carbon black is added. The several points of addition of carbon black are 6 to 8 feet apart in a 6' x 48' drum so that following each addition of carbon black the pellets acquire a surface coating of flocculent material and are rolled and hardened and ready for another coating. This procedure is repeated several times, and from 3 to 5 points of addition of flocculent black are provided. In a pelleting drum which is 6 feet in diameter and 48 feet long, the last 15 to 18 feet of the drum do not receive any flocculent material, and in this zone the pellets are hardened and polished.

The pellets thus-produced are withdrawn from drum 1 via divider box 5 which is constructed in such a manner that the pellets discharge from the drum in two portions. One of these portions passes via conduit 6 to storage, shipment or other disposal means not shown. The remaining portion of the pellets is passed through conduit 7 and drops onto conveyor 8. This conveyor may be any type of conveyor desired, but it is preferred that the conveyor be an endless belt type. The conveyor transports the pellets as received from conduit 7 and discharges them into hopper 9 from which they pass through conduit 10 into the inlet end of drum 1. I operate my process with a recycle ratio of recycled pellets to carbon black feed within the range of 0.5:1 to 2:1, and temperature within the pelleting drum is maintained at a temperature within the range of 300 to 600° F. by the introduction of hot combustion gases, as described below.

In order to deposit sulfur particles on the carbon black while the carbon black is being pelleted, a hydrocarbon fuel, such as natural gas, is introduced to furnace 11 via line 12. Sufficient air is also introduced to furnace 11 along with the fuel to burn the fuel, and the oxidation effluent leaves the furnace via line 13. In furnace 11 no more oxygen than that required for complete combustion of the fuel is used, and the furnace effluent is oxygen-free. The hot furnace effluent is used to maintain the desired temperature in drum 1. Hydrogen sulfide is introduced to the system via line 14, and the mixture of furnace effluent and hydrogen sulfide passes via line 15. Prior to passage of the gaseous mixture into drum 1 air is also introduced to the system via line 16, and the entire gaseous mixture enters drum 1 via line 17. The amount of air used is sufficient to produce a molar ratio of hydrogen sulfide to oxygen of 2:1. In drum 1 the hydrogen sulfide is oxidized to form colloidal sulfur particles which deposit on the carbon black pellets being formed, in the manner disclosed hereinabove. The pellets withdrawn from drum 1 contain from 1 to 10 weight per cent sulfur, and the pellets are ready for further use, such as in a rubber compounding operation.

Alternatively, the mixture of furnace effluent, hydrogen sulfide and air may be introduced to drum 1 multipointwise. In that event, only a portion of the mixture enters drum 1 via line 17, and the remaining portion of the gaseous mixture passes via lines 18 and 19. This latter portion is then subdivided into portions equal to that portion of the mixture entering via line 17 and introduced to the drum via lines 20, 21 and 22.

In another alternative method of operation, air is introduced to the system via lines 23 and 19 in lieu of line 16. Then only furnace effluent and hydrogen sulfide enter drum 1 via line 17, and the air for the oxidation of the hydrogen sulfide enters drum 1 via lines 20, 21 and 22 in equal portions. Multipointwise injection of air to drum 1 affords a convenient means for obtaining uniform dispersion of sulfur throughout the carbon black pellets since the oxidation of the hydrogen sulfide, with the consequent sulfur formation, is not localized in drum 1, and sulfur deposition on the carbon black is uniformly effected in drum 1. If it is desired to produce carbon black pellets containing sulfur deposited on the surface of the pellets, the air and hydrogen sulfide are injected to drum 1 via line 17 and the oxidation reaction occurs near the point of product withdrawal from drum 1.

Exit gases from drum 1 are withdrawn via line 24, and they are returned via line 25 and blower 26 to furnace 11 where they are again heated for use in drum 1. In order to prevent the accumulation of inert gases, such as combustion gases and nitrogen, in the system, exit gases from drum 1 are withdrawn into the atmosphere via line 27.

From the description of my invention hereinabove, modifications within the scope of my invention will be apparent to those skilled in the art. For example, I have disclosed that during the pelleting of the carbon black the hydrogen sulfide and air flow countercurrently to the line of flow of the carbon black, but it is within the scope of my invention that the flow be concurrent. In that event, the hydrogen sulfide and air are introduced to the pelleting drum at or near the inlet end of the drum, and the exit gases are withdrawn at or near the outlet end of the drum. By inlet and outlet ends of the drum I refer to the ends at which the flocculent carbon black enters the drum and at which the product pellets are withdrawn from the drum, respectively.

I claim:

1. The process which comprises contacting gaseous hydrogen sulfide and an oxygen-containing gas with a fluidized bed of carbon black particles, containing a small proportion of zinc oxide thereon at a temperature within the range of 200 to 1200° F., and recovering carbon black containing colloidal sulfur stabilized and deposited thereon as a product of the process.

2. A process according to claim 1 wherein a molar ratio of hydrogen sulfide to oxygen within the range of 1.8:1 to 2.2:1 is employed.

3. A process according to claim 1 wherein the oxygen-containing gas is air.

4. A process according to claim 1 wherein the hydrogen sulfide and oxygen-containing gas are contacted with the carbon black particles for a period of time sufficient to deposit from 0.05 to 50 weight per cent colloidal sulfur on said particles.

5. In a process for producing carbon black pellets wherein flocculent carbon black is introduced to the inlet end of a carbon black pelleting mill and wherein carbon black pellets are withdrawn from the outlet end of said pelleting mill, the improvement which comprises oxidizing hydrogen sulfide with an oxygen-containing gas in the presence of carbon black in said pelleting mill at a temperature within the range of 200 to 1200° F., and withdrawing from said pelleting mill carbon black pellets containing deposited colloidal sulfur.

6. A process according to claim 5 wherein the hydrogen sulfide and oxygen-containing gas enter the pelleting mill at the outlet end of said pelleting mill and wherein the flow of hydrogen sulfide and oxygen-containing gas is countercurrent to the flow of carbon black.

7. A process according to claim 5 wherein only a portion of the hydrogen sulfide and oxygen-containing gas enters the pelleting mill at the outlet end of said pelleting mill and wherein the remaining hydrogen sulfide and oxygen-containing gas are introduced multipointwise along the length of said pelleting mill.

8. A process according to claim 5 wherein hydrogen sulfide enters the pelleting mill at the outlet end of said mill and wherein oxygen-containing gas is introduced multipointwise along the length of said mill.

SAMUEL C. CARNEY.

References Cited in the file of this patent

UNITED STATES PATENTS

| Number | Name | Date |
|---|---|---|
| 1,917,689 | Baum | July 11, 1933 |
| 1,984,971 | Herold et al. | Dec. 18, 1934 |
| 1,999,573 | Odell | Apr. 30, 1935 |
| 2,043,084 | Ward et al. | June 2, 1936 |
| 2,316,201 | Wallden et al. | Apr. 13, 1943 |
| 2,427,238 | Swart | Sept. 9, 1947 |